United States Patent
Tustison

[11] 3,946,315
[45] Mar. 23, 1976

[54] SINGLE FREQUENCY SIGNALLING IN A RADIOTELEPHONE COMMUNICATION SYSTEM WITH IDLE CONDITION SIGNAL GENERATOR AT ONE TERMINAL ACTIVATED BY ANOTHER TERMINAL

[75] Inventor: Galen F. Tustison, Palos Verdes, Calif.

[73] Assignee: Hughes Aircraft Company, Culver City, Calif.

[22] Filed: June 27, 1975

[21] Appl. No.: 591,211

[52] U.S. Cl. .................. 325/55; 179/41 A; 325/2; 325/5; 325/15; 343/177
[51] Int. Cl.² .. H04M 7/16; H04M 3/20; H04B 1/38
[58] Field of Search .............. 325/2, 3, 5, 8, 51, 55, 325/15; 343/175, 177; 179/41 A, 2 E

[56] References Cited
UNITED STATES PATENTS

| | | |
|---|---|---|
| 2,607,887 | 8/1952 | Gissler et al. .................... 325/51 |
| 3,209,258 | 9/1965 | Collins, Jr. et al. ................ 325/3 |
| 3,292,087 | 12/1966 | Carver ............................... 325/64 |
| 3,377,435 | 4/1968 | Lippert .............................. 179/41 |
| 3,428,899 | 2/1969 | Sekimoto ........................... 325/38 |
| 3,458,664 | 7/1969 | Adlhoch et al. ................... 179/41 |
| 3,517,312 | 6/1970 | Yamato et al. ..................... 325/4 |
| 3,555,424 | 1/1971 | Malm ................................ 325/53 |
| 3,571,519 | 3/1971 | Tsimbidis .......................... 179/41 |
| 3,688,195 | 8/1972 | Muller ............................... 325/55 |

*Primary Examiner*—Robert L. Griffin
*Assistant Examiner*—Marc E. Bookbinder
*Attorney, Agent, or Firm*—W. H. MacAllister, Jr.; D. O. Dennison

[57] ABSTRACT

Single frequency signaling system which simulates the low level tone during the idle circuit condition even though the radio frequency carriers in the transmission link through a repeater have been turned off. Said system utilizes 2600 Hz detectors having long time constants to turn the transmitters on and off and to connect 2600 Hz oscillators to the receive lines to simulate the idle circuit condition.

7 Claims, 3 Drawing Figures

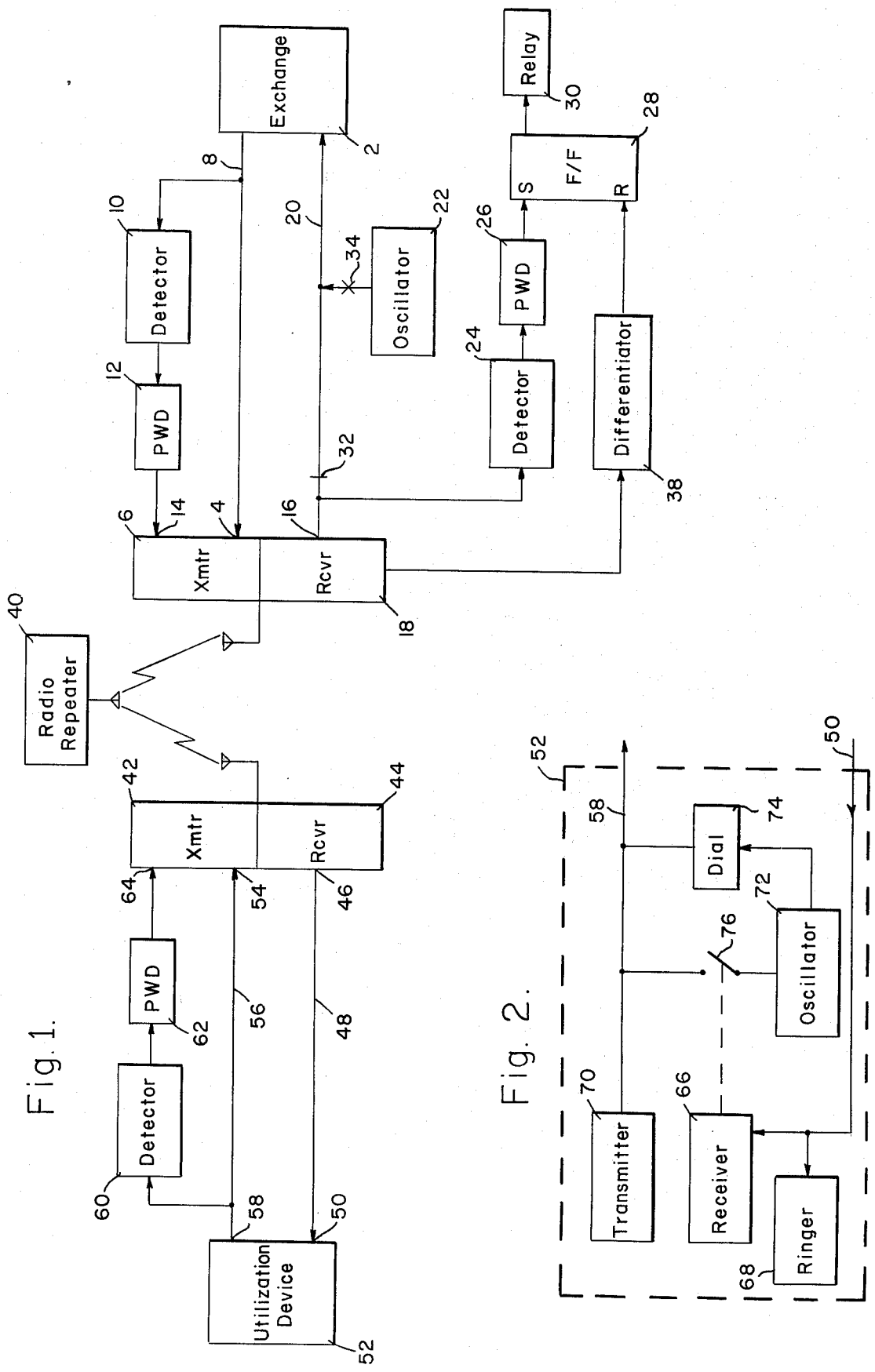

SINGLE FREQUENCY SIGNALLING IN A RADIOTELEPHONE COMMUNICATION SYSTEM WITH IDLE CONDITION SIGNAL GENERATOR AT ONE TERMINAL ACTIVATED BY ANOTHER TERMINAL

FIELD OF THE INVENTION

This invention relates to radio frequency communication systems and more specifically to radio frequency communications systems which are compatible with land based telephone systems.

DESCRIPTION OF THE PRIOR ART

In land based telephone systems, it is frequently necessary to span great distances over which wire cannot be laid. Accordingly, radio frequency communications links which are compatible with land based telephone systems are used.

For radio frequency communications links to be compatible with land based telephone systems, it is absolutely necessary that the system be capable of transmitting and receiving not only the voice signals but also the ringing, dialing, and idle circuit signals. Since the ringing, dialing, and idle circuit signals are all voice frequency signals, a standard communications system can be easily made compatible with a land based telephone system. Such a communications system is continuously on so as to transmit the voice, ringing, and dialing signals and in particular the continuous idle circuit signal. One disadvantage of such a system is apparent in only a few specific applications in which power is at a premium. If power is at a premium, the continuous operation of the communications system is undesirable. Such applications are when either termination of the system is in a remote location or both terminations are in remote locations, the radio frequency repeater is in a remote location, or all three are in remote locations.

Accordingly, it is a general object of the present invention to provide a radio frequency communications system which is not transmitting continuously.

It is another object of the present invention to provide a radio frequency communications system which is compatible with land based telephone systems.

It is yet another object of the present invention to provide a radio frequency communications system which simulates the idle circuit signal to the land based telephone system even if the communications system is not transmitting.

It is still another object of the present invention to provide a radio frequency communications system which conserves the radio frequency repeater's power.

SUMMARY OF THE INVENTION

In keeping with the principles of the present invention, the objects in one embodiment are accomplished with the unique combination of a full duplex radio frequency communications link utilizing a transmitter and receiver at each end of the link and a radio frequency repeater to complete the link, a land based telephone system coupled to one transmitter and receiver set, a utilization device coupled to the other transmitter and receiver set, means at each of the sets for turning the transmitters on and off in response to the presence of an idle circuit condition signal, and a means for coupling and uncoupling a simulated idle circuit condition signal generator to the receiver output going to the telephone system respectively in response to the presence of an idle circuit condition signal and to the occurrence of a received signal. Therefore, when an idle circuit condition signal is present at either or both ends of the communications link, the transmitters are turned off and a simulated idle circuit condition signal is coupled to receiver output going to the telephone system. Alternately, when the idle circuit condition signal is removed, the transmitters at each end turn on and the simulated idle circuit condition signal is uncoupled.

In another embodiment, the objects of the present invention are accomplished with a unique combination similar to that previously discussed. In this second embodiment, both ends of the communications link are coupled to land based telephone systems and contain means for coupling and uncoupling a simulated idle circuit condition signal generator to the receiver output. Therefore, when the idle circuit condition signal ceases, both transmitters turn on and the simulated idle circuit condition signal is uncoupled from both receiver outputs.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which:

FIG. 1 is a block diagram of a foreign exchange telephone system in accordance with the teachings of the present invention;

FIG. 2 is a block diagram of a representative implementation of a utilizatiion device in FIG. 1.

DESCRIPTION OF THE PREFERRED EMBODIMENTS

Figure 3:
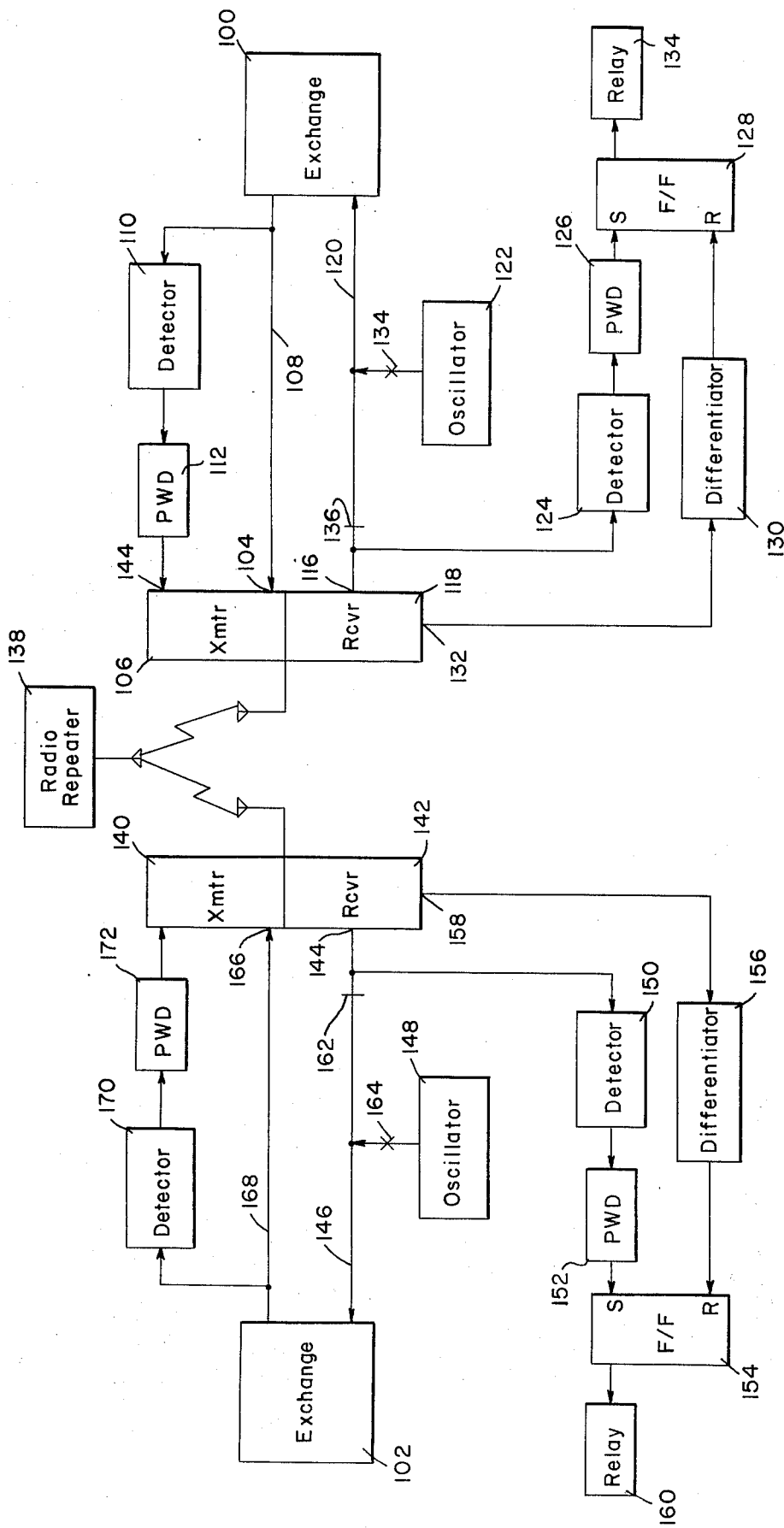
FIG. 3 is a block diagram of a trunkline telephone system in accordance with the teachings of the present invention.

Referring more specifically to the drawings, FIG. 1 is a simplified block diagram of a foreign exchange telephone system in accordance with the teachings of the present invention. FIG. 1 represents one preferred embodiment of the two described herein.

Referring to the system shown in FIG. 1, the system includes a land based telephone system represented by telephone exchange 2. The voice frequency output from exchange 2 is coupled to the voice frequency input 4 of transmitter 6 by telephone line 8. The input of 2600 Hz detector 10 is coupled to line 8. The output of 2600 Hz detector 10 is coupled to the input of pulse width discriminator (PWD) 12. The output of PWD 12 is coupled to the transmitter ON/OFF input 14 of transmitter 6.

The voice frequency output 16 of receiver 18 is coupled to voice frequency input of exchange 2 via telephone line 20. A 2600 Hz oscillator 22 is coupled to line 20. The input of 2600 Hz detector is also coupled to line 20. The output of detector 24 is coupled to pulse width discriminator (PWD) 26. The output of PWD 26 is coupled to the set input of flip-flop 28. The logical 1 output of flip-flop (F/F) 28 is coupled to relay 30. Normally closed relay contacts 32 of relay 30 are inserted in line 20. Also, normally open relay contacts 34 of relay 30 are inserted between the output of oscillator 22 and line 20. The AGC output 36 of receiver 18 is coupled to the input of differentiator 38. The output of differentiator 38 is coupled to the reset input of F/F 28.

Radio repeater 40 is coupled to transmitter 6 and receiver 18 by radio wave energy. Radio repeater 40 is coupled via radio wave energy to transmitter 42 and receiver 44. The voice frequency output 46 of receiver 44 is coupled via line 48 to the voice frequency input 50 of utilization device 52. The voice frequency output 58 of utilization device 52 is coupled to the voice frequency input 54 of transmitter 42 via line 56. The input of a 2600 Hz detector 60 is also coupled to the ouput 58 of utilization device 52 by means of line 56. The output of detector 60 is, in turn, coupled to the input of pulse width discriminator (PWD) 62. The output of PWD 62 is coupled to the ON/OFF input 64 of transmitter 42.

In practice, transmitters 42 and 6 are of the type such that when a logical "one" is applied to the ON/OFF inputs 4 and 64, the transmitters 6 and 42 turn off their radio frequency carriers. Also, PWD's 12, 26 and 62 are of the type such that when a logical "one" is applied to the input, they generate a logical "one" so long as the width of the logical "one" is longer than some specified time and is present at the input of PWD's 12, 26 and 62. Furthermore, 2600 Hz detectors 12, 24 and 60 are of the type which generate a logical "one" at the output so long as a 2600 Hz signal is present at the input. In addition, transmitters 6 and 42 and receivers 18 and 44 may be of the frequency modulation type and of standard circuitry. Radio repeater 40 may be one or more radio frequency transponders. Furthermore, utilization device 52 is of the type which generates a 2600 Hz signal on its voice frequency output 58 when the utilization device is not in use and may generate dialing signals and accept the ringing signal at the voice frequency input 50. Said utilization device may be type shown in FIG. 2, discussed infra.

For the purpose of illustration, assume initially that both transmitters 6 and 42 are on and a normal telephone conversation is occurring and about to terminate. Assume further that the conversation terminates first at utilization device 52. As soon as utilization device 52 is not in use, utilization device 52 generates a 2600 Hz signal to indicate an idle circuit condition. The 2600 Hz signal appears at the voice frequency output of device 52 and is coupled to the voice frequency input 54 of transmitter 42 via line 56. The 2600 Hz signal at the voice frequency input 54 is modulated onto the transmitted radio frequency carrier and is transmitted by transmitter 42 to radio repeater 40.

Radio repeater 40 retransmits the received signal to receiver 18. Receiver 18 demodulates the received signal and the 2600 Hz signal appears at the voice frequency output of receiver 18. The 2600 Hz signal is then coupled to exchange 2 via line 20. The 2600 Hz signal is also detected by detector 24 and detector 24 generates a logical "one" in response thereto. The logical "one" is coupled to the input of PWD 26. If the length of the logical "one" exceeds the specified length requirement of PWD 26, PWD 26 generates another logical "one" which is coupled to the set input of F/F 28. The occurrence logical "one" at the input of F/F 28 causes F/F 28 to generate still another logical "one" which causes relay 30 to energize. When relay 30 energizes, contacts 32 open and contacts 34 close thereby disconnecting the output 16 of receiver 18 from line 20 and connecting oscillator 22 to line 20. Oscillator 22 simulates the 2600 Hz idle circuit condition signal.

Moreover, exchange 2 detects the presence of the 2600 Hz signal on line 20 and in response thereto generates a 2600 Hz signal on line 8 to indicate an idle circuit condition. Detector 10 senses the presence of the 2600 Hz signal on line 8 and generates a logical "one" at its output which is coupled to PWD 12. If the length of the logical "one" generated by detector 10 exceeds the specified length requirement of PWD 12, PWD 12 generates a logical "one" which is applied to the ON/OFF input 14 of transmitter 6 thereby turning transmitter 6 off. The specified length requirement of PWD 12 is longer than that of PWD 26.

Additionally, detector 60 senses the presence of the 2600 Hz signal at the output 58 and generates a logical "one" which is applied to the input of PWD 62. If the length of the logical "one" generated by detector 60 exceeds the specified length requirement of PWD 62, PWD 62 generates a logical "one" which is applied to the ON/OFF input 64 of transmitter 42 thereby turning off transmitter 42. Also, the specified length requirement of PWD 62 is also longer than that of PWD 26 thereby allowing PWD 26 to operate before PWD 62 turns transmitter 42 off. The system operates in a similar fashion if the conversation is terminated in the land based telephone system represented by exchange 2.

Alternately, if a telephone call is initiated by operating utilization device 52, the generated 2600 Hz signal is removed from voice frequency (VF) output 58 thereby removing the 2600 Hz signal from VF input 54 of transmitter 42. Detector 60 senses the absence of the 2600 Hz signal and ceases to generate a logical "one." As soon as detector 60 stops generating a logical "one," PWD 62 stops generating a logical "one" thereby turning transmitter 42 on. The unmodulated radio frequency signal from transmitter 42 is received by repeater 40 and retransmitted to receiver 18.

When receiver 18 receives the retransmitted signal, there is a change in the output voltage at the AGC output 36. The change in voltage is differentiated by differentiator 38 and resets F/F 28. When F/F 28 is reset, relay 30 is deenergized thereby decoupling oscillator 22 from line 20 and coupling the VF output 16 of receiver 18 to line 20. Exchange 2 senses the absence of 2600 Hz on line 20 and replaces the 2600 Hz signal on line 8 with a dial tone. The dial tone is at a substantially different frequency than the 2600 Hz signal and is not a harmonic or sub-harmonic thereof.

Detector 10 senses the absence of the 2600 Hz signal on line 8 and ceases the generate a logical "one" thereby causing PWD 12 to cease to generate a logical "one." Accordingly, transmitter 6 turns on and the dial tone is transmitted via repeater 40 to receiver 44 where it is demodulated. The dial tone now appears at the VF output 46 of receiver 44 and is coupled to utilization device 52 via line 48. When utilization device 52 senses the dial tone, the circuit is complete and available for dialing signals to initiate the telephone call.

The block diagram shown in FIG. 2 is a typical example of a utilization device 52 which could be coupled to transmitter 42 and receiver 44 via lines 56 and 48. As shown in FIG. 2, receiver 66 is coupled to VF input 50. Also, ringer 68 is coupled to the VF input 50. Transmitter 70 is coupled to VF output 58. 2600 Hz oscillator 72 is coupled to VF output 58 through dial 74. 2600 Hz oscillator 72 is also coupled to VF output 58 via normally open switch 76. Switch 76 is mechanically coupled to receiver 66.

Ringer 68 is of the type which comprises both a converter to convert voice frequency ringing signals to 20 Hz ringing signal and an electromechanical bell responsive to said 20 Hz ringing signal. Switch 76 is coupled to receiver 66 such that when receiver 66 is not in use, switch 76 is closed thereby connecting 2600 Hz oscillator 72 to VF output 58 and indicating an idle circuit condition. Conversely, when receiver 66 is in use, switch 76 is open thereby disconnecting 2600 Hz oscillator 72 from VF output 58. Dial 74 is a standard telephone dial which generates bursts of 2600 Hz signal in response to dialing inputs.

It should be apparent to one skilled in the art that if transmitters 6 and 42 were voice activated, the outputs of PWD's 62 and 12 could be connected to relays which would open the lines 8 and 56 in response to a logical "one" from PWD's 62 and 12 thereby in effect turning off and on transmitters 6 and 42.

Referring now to FIG. 3, therein is shown a further embodiment of the invention employing the teachings of the present invention in a trunkline telephone system. The trunkline telephone system of FIG. 3 includes two land based telephone systems represented by telephone exchanges 100 and 102. The VF output of exchange 100 is coupled to VF input 104 of transmitter 106 via telephone line 108. The input and output of 2600 Hz detector 110 is coupled respectively to the VF output of exchange 100 and the input of PWD 112. The output of PWD 112 is coupled to the ON/OFF input 114 of transmitter 106.

The VF input of exchange 100 is coupled to the VF output 116 of receiver 118 via line 120. 2600 Hz oscillator 122 is coupled to the VF input of exchange 100. The input and output of 2600 Hz detector 124 are coupled respectively to the VF output 116 and the input of PWD 126. The output of PWD 126 is coupled to the set input of flip-flop (F/F) 128. The input and output of differentiator 130 are coupled respectively to the AGC output 132 of receiver 118 and the reset input of F/F 128. The logical "one" output of F/F 128 is coupled to relay 134. Normally closed relay contacts 136 and normally open relay contacts 138 of relay 134 are inserted respectively between the VF output 116 and the VF input of exchange 100 and between the output of 2600 Hz oscillator 122 and the VF input of exchange 100.

Transmitter 106 and receiver 118 are coupled via radio wave energy and radio repeater 138 to transmitter 140 and receiver 142. The VF output 144 of receiver 142 is coupled to the VF input of exchange 102 via telephone line 146. The output of 2600 Hz oscillator 148 is coupled to the VF input of exchange 102. The input and output of 2600 Hz detector 150 are coupled respectively to the VF output 144 of receiver 142 and the input of PWD 152. The output of PWD 152 is coupled to the set input of flip-flop (F/F) 154.

The input and output of differentiator 156 are coupled respectively to the AGC output 158 of receiver 142 and the reset input of F/F 154. The logical "one" output of F/F 154 is coupled to relay 160. Normally closed relay contacts 162 and normally open relay contacts 164 are inserted respectively between the VF output 144 and the VF input of exchange 102 and between the output of oscillator 148 and the VF input of exchange 102.

The VF output of exchange 102 is coupled to the VF input 166 of transmitter 140 via telephone line 168. The input and output of 2600 Hz detector 170 are coupled respectively to the VF output of exchange 102 and the input of PWD 172. The output of PWD 172 is coupled to the ON/OFF input 174 of transmitter 140.

Furthermore, transmitters 106 and 104; PWD's 112, 126, 150 and 172; detectors 110, 124, 150 and 170; and radio repeater 138 are all of the same type as previously described in the first embodiment.

For the purpose of illustration, we assume an initial condition of both transmitters 106 and 140 on and a normal telephone conversation is occurring and about to terminate. Assume further that the conversation terminates first in the land based telephone system connected to exchange 100. As soon as the call is terminated, exchange 100 generates a 2600 Hz signal to indicate an idle circuit condition. The 2600 Hz signal is applied to VF input 104 via telephone line 108. The 2600 Hz signal is transmitted by transmitter 106 to repeater 138 and retransmitted by repeater 138 to receiver 142.

Receiver 142 demodulates the received signal and the 2600 Hz signal appears at VF output 144. The 2600 Hz signal is coupled to the VF input of exchange 102 by line 146. Detector 150 senses the presence of the 2600 Hz signal at VF output 144 and generates a logical "one" so long as the 2600 Hz signal is present. If the length of the logical "one" generated by detector 150 exceeds the specified length requirement of PWD 152, PWD 152 generates another logical "one" which is coupled to the set input of F/F 154 thereby causing F/F 154 to generate a logical "one" which energizes relay 160. When relay 160 energizes, contacts 162 open and 164 close thereby disconnecting the output of receiver 142 from line 146 and connecting oscillator 148 to line 146. Oscillator 148 simulates the 2600 Hz idle circuit condition signal.

Exchange 102 senses the presence of the 2600 Hz signal at its VF input and generates its own 2600 Hz signal at its VF output terminal to indicate an idle circuit condition. The 2600 Hz signal is coupled to VF input 166 via line 168 and transmitted by transmitter 140 to repeater 138. Repeater 138 retransmits the radio signal to receiver 118 wherein it is demodulated. The 2600 Hz signal is present at VF output 116 and is coupled to the VF input of exchange 100 via line 120. 2600 Hz detector 124, PWD 126, F/F 128, relay 134, and 2600 Hz oscillator 122 operate in exactly the same manner as previously described for detector 150, PWD 152, F/F 154, relay 160, and oscillator 148 in response to the 2600 Hz signal.

Exchange 100 senses the presence of the 2600 Hz signal at its VF input and would generate a 2600 Hz signal at its VF output if one was not already present. 2600 Hz detector 110 senses the presence of the 2600 Hz signal on line 108 and generates a logical "one " so long as it is present. If the length of the logical "one" generated by detector 110 exceeds the specified length requirement of PWD 112, PWD 112 generates another logical "one" which is coupled to the ON/OFF input 114 thereby turning transmitter 106 off. 2600 Hz detector 170, PWD 172 and transmitter 140 operate in exactly the same manner as previously described for detector 110, PWD 112, and transmitter 114 in response to the 2600 Hz signal.

Alternately, if a telephone call is initiated on the land based telephone system coupled to exchange 102, the 2600 Hz signal on line 168 is removed. Detector 170 senses the absence of the 2600 Hz signal and ceases to generate a logical "one." As soon as detector 170 stops generating a logical "one," PWD 172 ceases to generate a logical "one" thereby turning transmitter 140 on. The unmodulated radio frequency signal from transmitter 140 is received by repeater 138 and retransmitted to receiver 118.

When receiver 118 receives the retransmitted signal, there is a change in the output voltage at the AGC output 132. The change in voltage is differentiated by differentiator 130 and resets F/F 128. When F/F 128 is reset, relay 134 is de-energized thereby decoupling oscillator 122 from line 120 and coupling the VF output 116 of receiver 118 to line 120. Exchange 100 senses the absence of 2600 Hz on line 120 and removes the 2600 Hz signal from line 108.

Detector 110 senses the absence of the 2600 Hz signal on line 108 and ceases to generate a logical "one" thereby causing PWD 112 to cease to generate a logical "one." Accordingly, transmitter 106 turns on. The unmodulated radio frequency signal from transmitter 106 is received by repeater 138 and retransmitted to receiver 142.

When receiver 142 receives the retransmitted signal, there is a change in the output voltage at the AGC output 158. The change in voltage is differentiated by differentiator 150 and resets F/F 154. When F/F 154 is reset, relay 160 is de-energized thereby decoupling oscillator 148 from line 146 and coupling the VF output 162 of receiver 142 to line 146. Exchange 102 senses the absence of 2600 Hz on line 20 and thereby senses that the circuit is complete and available to transmit dialing signals to initiate the telephone call. Since the bursts of 2600 Hz signal which represent the dialing signal are very short in duration, the PWD's 112, 126, 152, and 172 which have long specific length requirements do not respond and the system is substantially insensitive to false triggering by dialing signals.

It should be apparent to one skilled in the art that if transmitters 106 and 140 were voice activated, the outputs of PWD 172 and 112 could be connected to relays which would open the lines 168 and 108 in response to a logical "one" from PWD's 112 and 172 thereby in effect turning off and on transmitters 106 and 140.

In all cases it is understood that the above-described embodiments are merely illustrative of but a small number of the many possible specific embodiments which can represent application of the principles of the present invention. Numerous and varied other arrangements can be readily devised in accordance with these principles by those skilled in the art without departing from the spirit and scope of the invention.

I claim:

1. A communication system comprising at least two radio frequency terminals and a radio frequency repeater wherein at least one of the terminals comprises, in combination:
   a land based telephone system;
   a first radio frequency transmitter coupled to said land based telephone system;
   a first radio frequency receiver coupled to said land based telephone system;
   means for turning said first transmitter off whenever and so long as said telephone system generates an idle circuit condition signal to said first transmitter;
   means for generating an idle circuit condition signal;
   means for coupling said means for generating an idle circuit condition signal to said telephone system whenever an idle circuit condition signal is received by said first receiver for longer than a first time interval; and
   means for uncoupling said means for generating idle circuit condition signal from said telephone system upon the occurrence of a received radio frequency signal by said first receiver.

2. The communications system according to claim 1 wherein said means for turning said first transmitter off comprises:
   an ON/OFF control port in said first transmitter, said ON/OFF control port being responsive to digital signals; and
   a means for detecting the presence of an idle circuit condition signal coupled to said ON/OFF control port.

3. The communications system according to claim 2 wherein said means for detecting the presence of said idle circuit condition signal comprises a 2600 Hz detector.

4. The communications system according to claim 1 wherein said means for generating an idle circuit condition signal comprises a 2600 Hz oscillator.

5. The communications system according to claim 1 wherein said means for coupling the idle circuit condition signal generator comprises:
   a means for detecting the presence of the idle circuit condition signal;
   a flip-flop, said flip-flop having its set input coupled to the output of said means for detecting the presence of the idle circuit condition signal;
   a relay, said relay having a set of normally closed contacts and a set of normally open contacts, said normally closed contacts interposed between said first receiver and said telephone system and said normally open contacts interposed between said means for generating an idle circuit condition signal and said telephone system, said relay responsive to an output of said flip-flop to close said normally open contacts and open said normally closed contacts to couple said generating means to said telephone system and to uncouple said first receiver from said telephone system.

6. The communications system according to claim 5 wherein said means for uncoupling said idle circuit condition signal generator comprises:
   an automatic gain control output port in said first receiver providing a signal related to said received radio frequency signal; and
   a differentiator, said differentiator having its input and output coupled respectively to said AGC output port and the reset input of said flip-flop wherein a signal on said reset input allows said sets of relay contacts to assume said normally closed and open states.

7. The communications system according to claim 1 wherein at least one of the other terminals comprises, in combination:
   telephone terminal equipment device;
   a second radio frequency transmitter coupled to said equipment;
   a second radio frequency receiver coupled to said equipment; and
   means for turning said second transmitter off whenever and so long as said equipment generates an idle circuit condition signal to said second transmitter.

* * * * *

UNITED STATES PATENT OFFICE
CERTIFICATE OF CORRECTION

Patent No. 3,946,315                 Dated March 23, 1976

Inventor(s) GALEN F. TUSTISON

It is certified that error appears in the above-identified patent and that said Letters Patent are hereby corrected as shown below:

Column 2, line 59, should read as follows:

line 20.  The input of 2600 Hz detector --24-- is also coupled

Column 8, line 59, should read as follows:

telephone terminal equipment [device];

Signed and Sealed this

*first* Day of *June 1976*

[SEAL]

Attest:

RUTH C. MASON
*Attesting Officer*

C. MARSHALL DANN
*Commissioner of Patents and Trademarks*